United States Patent [19]

Rabe

[11] Patent Number: 5,018,879
[45] Date of Patent: May 28, 1991

[54] CAGE FOR ROLLING BEARINGS WITH LONGITUDINAL MOVEMENTS

[75] Inventor: Jürgen Rabe, Aurachtal, Fed. Rep. of Germany

[73] Assignee: INA Walzlager Schaeffler KG, Fed. Rep. of Germany

[21] Appl. No.: 577,266

[22] Filed: Sep. 4, 1990

[30] Foreign Application Priority Data

Sep. 21, 1989 [DE] Fed. Rep. of Germany ........ 3931446

[51] Int. Cl.$^5$ ........................ F16C 29/04; F16C 33/46
[52] U.S. Cl. ........................................ 384/51; 384/59
[58] Field of Search ........................ 384/50, 51, 54, 56, 384/59

[56] References Cited

U.S. PATENT DOCUMENTS 3,054,648  9/1962  Baver ................................. 384/51
3,927,919 12/1975  Bunzli ................................ 384/51

FOREIGN PATENT DOCUMENTS 1890032 3/1964 Fed. Rep. of Germany .
1168176 4/1964 Fed. Rep. of Germany ........ 384/50

Primary Examiner—Thomas R. Hannon
Attorney, Agent, or Firm—Bierman and Muserlian

[57] ABSTRACT

A cage made of polymeric material for a rolling bearing for longitudinal movements comprising two longish, parallel cage plates disposed at a distance from each other and containing pockets arranged crosswise to their longitudinal extension for the reception of cylindrical rolling elements, the cage plates being joined to each other by at least one first crossbar made in one piece with the cage plates, and extending over a part of the length of the cage plates the thickness of the crossbar being less than the thickness of the cage plates and the crossbar acts as a so-called film hinge to permit the cage plates to be brought into different inclined positions relative to each other, characterized in that at least one other crossbar is arranged along another partial length of the cage plates and has a roof-like, curved or similar shape so that its neutral axis between the two cage plates is longer than the neutral axis of the first-mentioned crossbar, and the cage has a stable shape.

3 Claims, 2 Drawing Sheets

CAGE FOR ROLLING BEARINGS WITH LONGITUDINAL MOVEMENTS

STATE OF THE ART

Cages made of polymeric material for a rolling bearing for longitudinal movements comprising two longish, parallel cage plates disposed at a distance from each other and containing pockets arranged crosswise to their longitudinal extension for the reception of cylindrical rolling elements, the cage plates being joined to each other by at least one crossbar made in one piece with the cage plates and extending over a part of the length of the cage plates, the thickness of the crossbar being less than the thickness of the cage plates with the crossbar acting as a so-called film hinge to permit the cage plates to be brought into different inclined positions relative to each other are known from DE-AS No. 1,168,176. Such cages are intended to be used with V-raceways with the two cage plates and the flexible crossbar together forming a coherent component. The crossbar is so dimensioned that the plates can be brought into any desired angle to each other by plastic or elastic deformation of the crossbar. DE-GM No. 1,890,032 also shows a double-rowed flat cage which can be used as a linear guiding element in one plane or, by the formation of an angle between the cage plates, for rectilinear displacement in two planes. Given the movability of the cage plates relative to each other and by this, also the plastic or elastic deformation of the diminished material between the cage plates, material dimunition is realized in this case by a wedge-shaped groove to clearly obtain the design of an articulated axle.

If such a cage is to be used with the two cage plates in an inclined position rather than as a planar construction, it can be bent into the desired inclined position by heating in an apparatus with due consideration of the relaxation of the cage material. This has the following disadvantages: the bending process necessitates an additional work step. In the region of the articulated axle formed by the wedge-shaped groove, i.e. in the region of the so-called film hinge, the slightest variations in the processing conditions can lead to fractures since the process-dependent material properties determine the elastic behavior and the deformability of the film hinge. Since the relaxation of the polymeric material cannot be exactly defined, differing inclinations of a broad tolerance range can occur along the cage plates.

OBJECTS OF THE INVENTION

It is an object of the invention to design the cage so that it always has a shape stable in itself with the cage retaining its exact shape over a long period of time, both in the planar construction in which both the cage plates are situated in one common plane, and in the bent construction in which the two cage plates form a pre-determined angle with each other. The production of a bent cage from a planar cage should be able to be carried out in a simple manner.

This and other objects and advantages of the invention will become obvious from the following detailed description.

THE INVENTION

The novel cage of the invention made of polymeric material for a rolling bearing for longitudinal movements comprising two longish, parallel cage plates disposed at a distance from each other and containing pockets arranged crosswise to their longitudinal extension for the reception of cylindrical rolling elements, the cage plates being joined to each other by at least one first crossbar made in one piece with the cage plates and extending over a part of the length of the cage plates, the thickness of the crossbar being less than the thickness of the cage plates and the crossbar acts as a so-called film hinge to permit the cage plates to be brought into different inclined positions relative to each other, is characterized in that at least one other crossbar is arranged along another partial length of the cage plates and has a roof-like, curved or similar shape so that its neutral axis between the two cage plates is longer than the neutral axis of the first-mentioned crossbar.

At least one other crossbar is arranged along another partial length of the cage plates and has a roof-like, curved or similar shape so that its neutral axis between the two cage plates is longer than the neutral axis of the first-mentioned crossbar. In a planar cage, this design results in the formation of partial regions in the connecting region whose surfaces lie in differently inclined planes and which act as stiffening ribs so that a maintenance of the exact cage shape and particularly of the position of the two cage plates relative to each is favored. This effect also occurs when the planar cage is bent over through a small bending angle of say 10 degrees after which, the two cage plates snap automatically into an inclined position pre-determined by the structural dimensions of the connecting region. After this bending and extension of the cage material, the neutral axes of the different crossbars reassume their original lengths. A stable state of tension is then again attained in the partial connecting regions in the new position. In the new inclined position, the two cage plates can, for example, form an angle of 90 degrees.

It is also possible to arrange several roof-shaped or curved crossbars spaced behind one another in the longitudinal direction of the cage. By this measure, the work of bending for forming the bent cage construction is reduced due to the material removals between the crossbars. The first-mentioned crossbar and the roof-shaped or curved other crossbar can also merge continuously into each other.

Referring now to the drawings:

FIG. 3 is a cross-section along line III—III through the cage of FIG. 1 with

Figure 3:
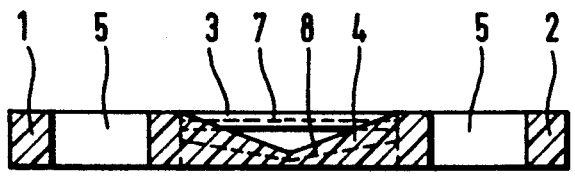
Figure 4:
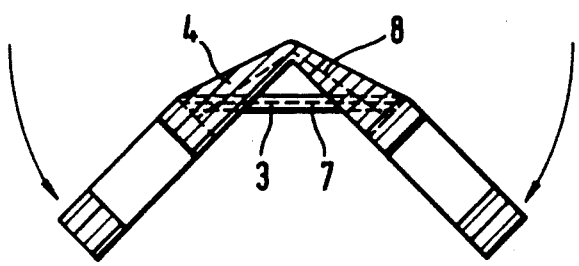
Figure 5:
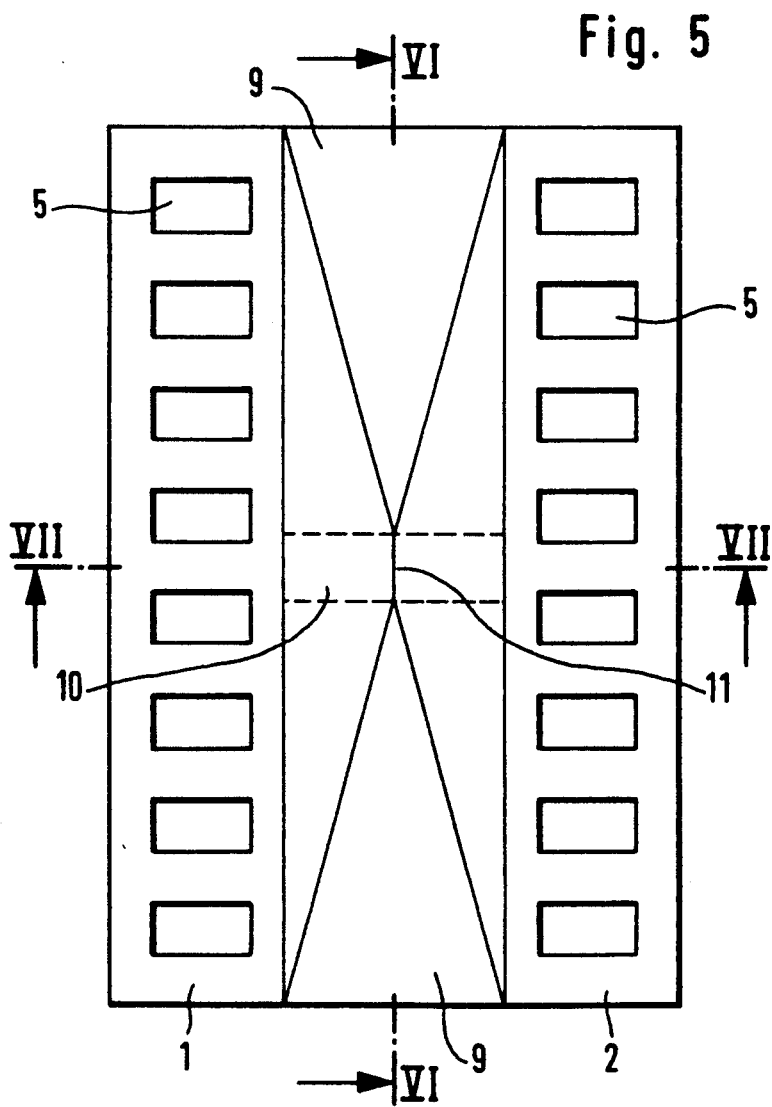

FIG. 4 being a section through a bent cage corresponding to FIG. 3 of the planar cage, FIG. 5 is a top view of another embodiment of a planar cage of the invention.

Figure 6:
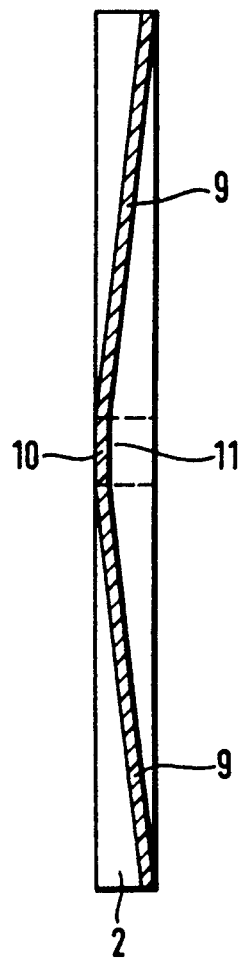

FIG. 6 is a cross-section along line VI—VI through the cage of FIG. 5 and

Figure 7:
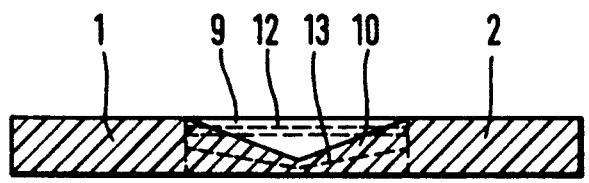

FIG. 7 is a cross-section along line VII—VII through the cage of FIG. 5 with

Figure 8:
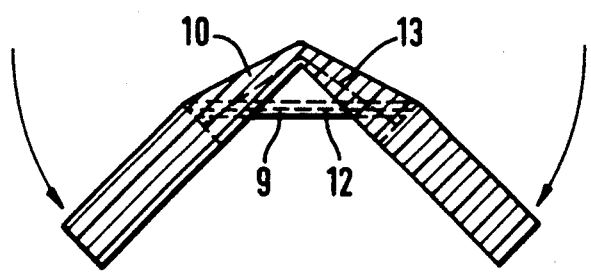

FIG. 8 being a section through a bent cage corresponding to FIG. 7 of the planar cage.

Figure 1:
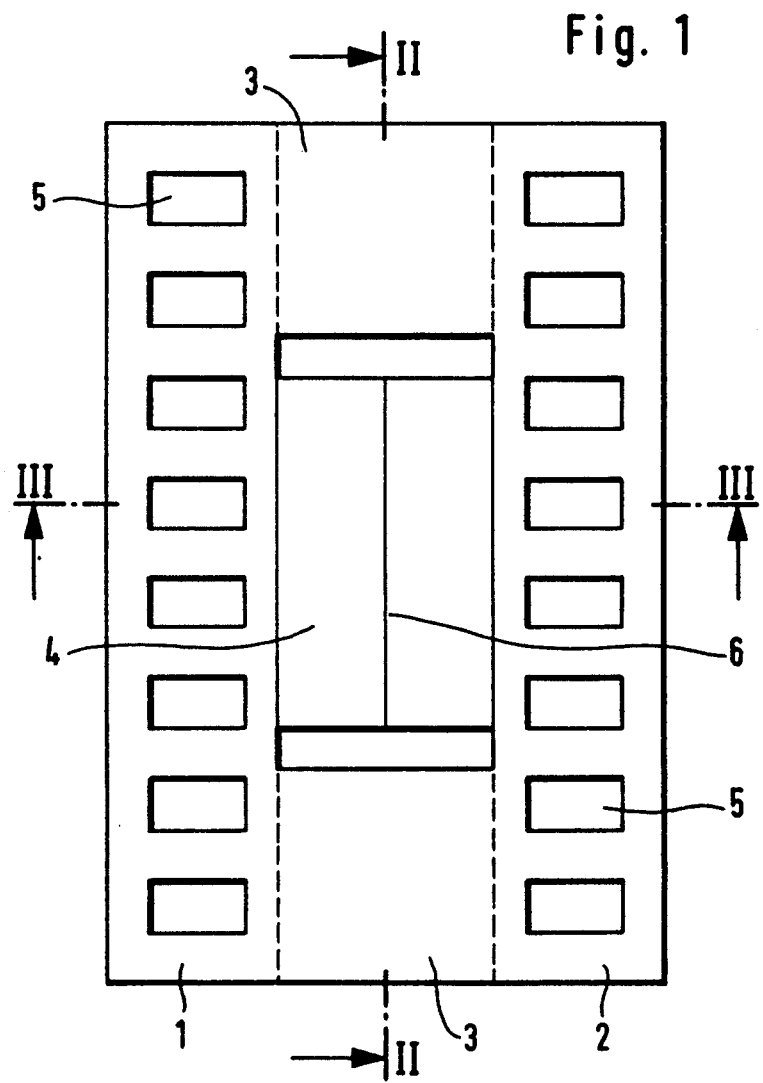
FIG. 1 is a top view of a planar cage of one embodiment of the invention.
Figure 2:
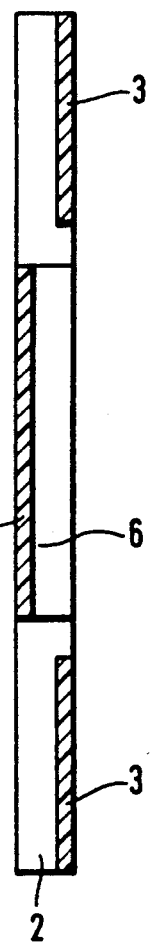
FIG. 2 is a cross-section along the line II—II through the cage of FIG. 1.

The cage of FIGS. 1 to 3 comprises two parallel cage plates 1 and 2 joined to each other by a connecting region and made in one piece out of a polymeric material. The connecting region situated between the two cage plates 1 and 2 comprises two crossbars 3 which start from the respective planes of two frontal ends of the cage plates and another crossbar 4 situated between them. These crossbars have a lesser thickness than the two cage plates 1 and 2 which are provided with pockets 5 for the reception of rolling elements. The crossbars 3 have a uniform thickness, whereas the thickness of the crossbar 4 increases from the longitudinally extending center line of two cage plates 1 and 2 towards the plates. Thus, the crossbar 4 comprises a wedge-shaped groove 6 which is open upwards and whose bottom forms an articulated axle about which the two cage plates 1 and 2 can be bent in the direction of the arrows from the level position into an inclined position as shown in FIG. 4. As a result of the differing designs of the crossbars 3 and 4, neutral axes of differing length are obtained in the crossbars. Thus, the neutral axes 7 of the crossbars 3 between the cage plates 1 and 2 are shorter than the neutral axis 8 of the crossbar 4. When the cage is bent from the level position of FIG. 3 into the inclined position of FIG. 4, the neutral axes 7 and 8 reassume their original lengths after the extension of the material. Therefore, even after snapping into the inclined position, the cage has a stable shape which does not change over the course of time.

The planar cage of FIGS. 5 to 7 and the bent cage of FIG. 8 formed from it is similar in design except in this case, in the connecting region between the cage plates 1 and 2 there are crossbars 9 of uniform thickness starting from the frontal planes of the cage plates and extending at an angle to the upper and lower limiting planes of the cage which, in the central region of the cage merge continuously into a crossbar 10 which comprises a groove 11 extending in the longitudinal direction of the cage and forming the articulated axle for the bending of the cage plates 1 and 2. The crossbar 10, like the crossbar 4 of the cage embodiment of FIGS. 1 to 4, is therefore also roof-shaped so that its neutral axis 13 is longer than the neutral axes 12 of the crossbars 9.

Various modifications of the cage of the invention may be made without departing from the spirit or scope thereof and it is to be understood that the invention is intended to be limited only as defined in the appended claims.

What I claim is:

1. A cage made of polymeric material for a rolling bearing for longitudinal movements comprising two longish, parallel cage plates disposed at a distance from each other and containing pockets arranged crosswise to their longitudinal extension for the reception of cylindrical rolling elements, the cage plates being joined to each other by at least one first crossbar made in one piece with the cage plates and extending over a part of the length of the cage plates, the thickness of the crossbar being less than the thickness of the cage plates and the crossbar acts as a film hinge to permit the cage plates to be brought into different inclined positions relative to each other, characterized in that at least one other crossbar is arranged along another partial length of the cage plates and has a roof-like shape so that its neutral axis between the two cage plates is longer than the neutral axis of the first-mentioned crossbar.

2. A cage of claim 1 wherein several roof-shaped crossbars spaced behind one another are arranged in the longitudinal direction of the cage.

3. A cage of claim 1 wherein the first crossbar and the roof-shaped other crossbar merge continuously into each other.

* * * * *